Feb. 20, 1940.                J. C. McKENNA                2,190,726
                              CAR UNLOADING
                            Filed Feb. 17, 1939
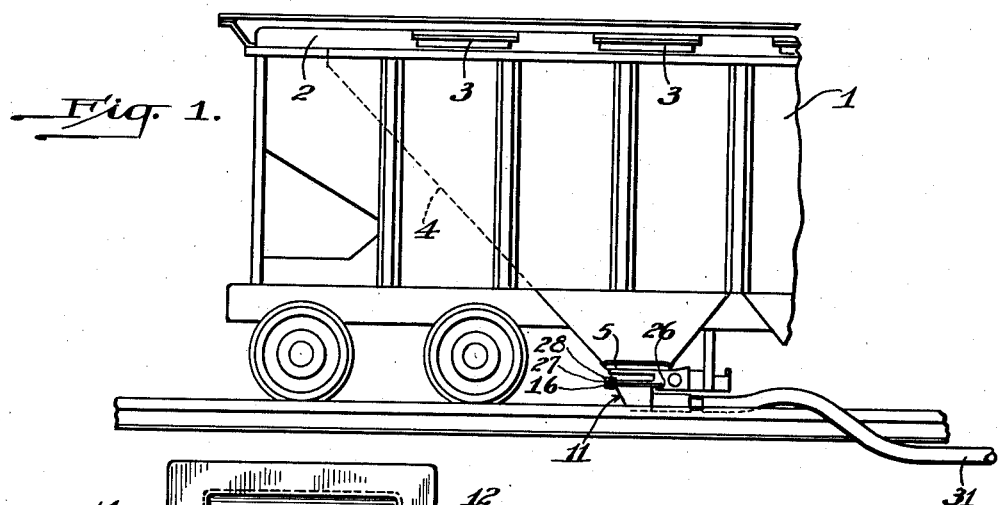
Fig. 1.
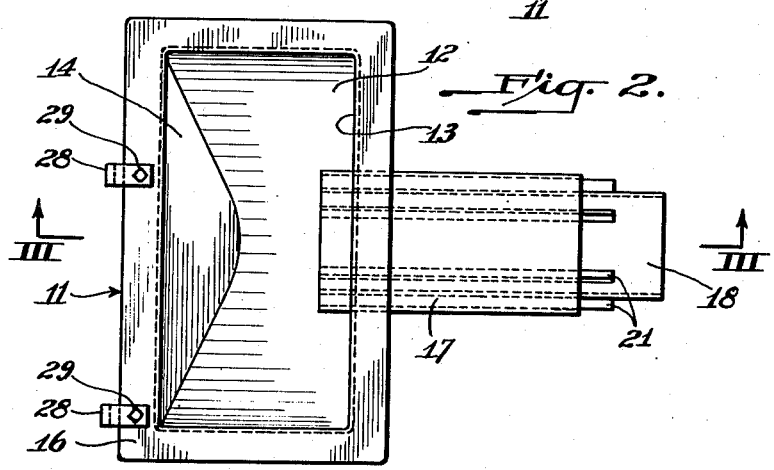
Fig. 2.
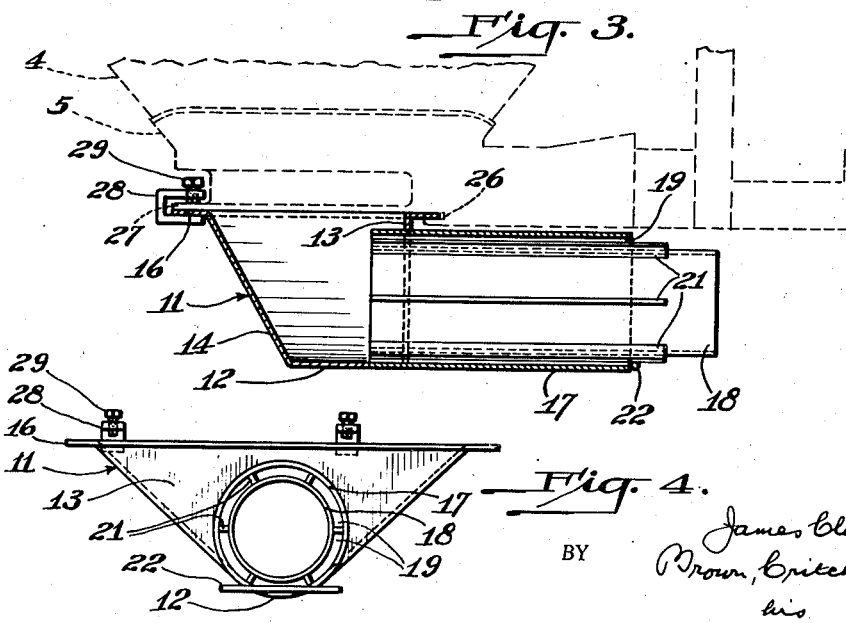
Fig. 3.
Fig. 4.
INVENTOR.
James Cline McKenna
BY Brown, Critchlow & Flick
his ATTORNEYS.

Patented Feb. 20, 1940

2,190,726

UNITED STATES PATENT OFFICE 2,190,726

CAR UNLOADING

James Cline McKenna, Pittsburgh, Pa., assignor to Diamond Alkali Company, Pittsburgh, Pa., a corporation of Delaware Application February 17, 1939, Serial No. 256,949

6 Claims. (Cl. 214—44)

This invention relates to the unloading of freight cars and similar receptacles containing bulk materials by suction, and more particularly to apparatus for connecting a suction conveyor with the hopper of a hopper bottom car which is to be unloaded.

Suction conveyor systems are now used widely for unloading bulk materials from, for example, railway cars. Almost any granular, crushed or finely divided material capable of flow can be handled in this manner, a few examples being grains, alum, borax, salt, soda ash, coal, silica, wood flour, lime, dried clays, and the like. Such a suction conveyor system includes a conveyor tube associated with a source of suction. The inlet end of this tube is generally in the form of a flexible hose provided with a nozzle that has an auxiliary air inlet spaced above its end for the purpose of permitting a steady air flow into the tube when the end of the nozzle is inserted in a pile of bulk material.

Such suction systems as applied heretofore to the unloading of railway cars have been open to certain disadvantages. Thus, if the workman who is manipulating the flexible hose in unloading a box car, for example, inserts the nozzle too deeply into the pile of material, either inadvertently or to hasten the unloading operation, the auxiliary air inlet may become covered by the material. The consequent retardation or stoppage of the air flow automatically shuts off the suction apparatus which is generally located a considerable distance from the material being unloaded, so that time is consumed in placing the system in operation again, thus slowing down the unloading operation. The workman, not wishing to be put to the trouble of walking back to the suction apparatus to start it again, generally tries to make sure that he does not stall the system by keeping the auxiliary air inlet of the nozzle well out of the pile of material. However, this results in the nozzle being not extended into the pile of material to the optimum distance, wherefore the unloader does not operate at its rated capacity and the unloading time and expense are increased. In any event, such hand-controlled operations are variable and the feed is irregular so that not only may the system be underloaded part of the time, but also there may at intervals be surging which momentarily overloads the suction apparatus, thus adding to upkeep expenses. Another expense of this character comes from repair and replacement of the flexible hose which is constantly moved about and flexed during unloading.

Before shipping many bulk materials in box cars the cars must be prepared to receive them, as by cleaning or sweeping the cars, and, in some cases, installing paper lining and dunnage. Ordinarily it is necessary to make provision for keeping the material away from the doors so that when they are opened it will not flow out. Even with such precautions, however, foreign substances may contaminate the material. For instance, splinters loosened from the car floor by the suction conveyor nozzle may enter the nozzle with the material from the car.

To eliminate such and other troubles and expense, and to minimize the likelihood of contamination by dirt and dust in transit, some amounts of bulk materials are shipped in closed cars provided with hopper bottoms. As it is not practicable to unload such cars by inserting the hose of a suction conveyor down through their hatches, the car contents are dumped through the hoppers into a trough or chute permanently installed beneath the tracks and provided with a screw conveyor. However, open conveyor troughs of this character have the disadvantage that they may accumulate dirt and water.

It is among the objects of this invention to provide apparatus permitting the suction unloading of hopper bottom cars from their bottom outlets, or hoppers. More specific objects are to provide detachable means for connecting the outlet of a hopper to the inlet hose of a suction conveyor system which permits the hopper to be unloaded at the maximum capacity of the conveyor system, does not clog, does not stall the conveyor system, protects the bulk material from dirt and water, requires no attention during operation, and substantially reduces unloading times as compared with manual operation of unloading freight cars by suction.

In accordance with this invention an auxiliary hopper is formed for detachable association with the outlet of a main hopper, and it is provided with a tube projecting from one side for receiving another tube in annular, or spaced, relation. The inner tube is adapted to be connected at its outer end to the inlet hose of a suction conveyor and to form a nozzle for it. Preferably, this nozzle is provided on its outer surface with a plurality of circumferentially spaced fins or the like members that space it from the inner surface of the hopper tube. Means may also be provided for limiting the distance the nozzle can be inserted into the hopper tube.

In the use of this apparatus the auxiliary hopper is attached to the main hopper, the hopper door is opened to allow the bulk material to start flowing by gravity into the auxiliary hopper, and the suction through the conveyor hose and the nozzle draws air inwardly through the hopper tube through the annular passage between it and the nozzle. As this air enters the inner end of the nozzle it carries with it the material in the auxiliary hopper adjacent the inner end of the hopper tube. The conveyor operates under uniform load and at maximum capacity because the auxiliary hopper is constantly maintained full of material flowing from the main hopper above, and the conveyor can not clog because there is no danger of plugging the air inlet around the nozzle.

The preferred embodiment of the invention is illustrated in the accompanying drawing in which Fig. 1 is a fragmentary side view of a closed hopper bottom car to which the unloader has been attached; Fig. 2 is an enlarged plan view of the unloader; Fig. 3 is a vertical section through the unloader taken on the line III—III of Fig. 2 and showing the unloader associated with the car hopper; and Fig. 4 is a side view of the unloader.

Referring to Fig. 1 of the drawing, a railway car 1 of the hopper type has a roof 2 provided with a plurality of hatchways normally sealed by removable hatches 3. The interior of the car is divided by partitions or bulk heads into several separate hoppers 4 each of which projects below the car sills and terminates in a discharge outlet. The hopper outlets are normally closed by various means. In the embodiment shown the hoppers are closed by gate valves 5 of a commonly used type made in accordance with Patent No. 2,072,292 to Argyle Campbell. These gate valve closures are of well known construction, being provided with a horizontally sliding gate or door, and require no detailed description.

It is a feature of this invention that bulk material within the car is conveyed from its hopper outlets by suction. Accordingly, an auxiliary hopper 11, which is shallow enough to be inserted readily between the bottom of a car hopper and the railway ties, is provided with an upwardly diverging bottom wall 12 (Fig. 4), and two side walls 13 and 14 (Fig. 3), one of which, 13, is substantially vertical and the other of which, 14, is inclined upwardly and outwardly. The upper edges of all of these walls terminate in a common horizontal plane and are surrounded by a lateral flange 16. The shape of the opening into the top of this auxiliary hopper corresponds to that of the main hopper outlet.

Extending through a circular opening in vertical side wall 13 of the auxiliary hopper is a substantially horizontal tube 17 that projects a short distance into the hopper as seen in Figs. 2 and 3. Removably disposed in this tube is a smaller tube or nozzle 18. The two tubes are spaced apart to provide an air passage 19 (Fig. 4) between them, preferably by means of circumferentially spaced fins 21 extending longitudinally of the nozzle 18 to the outer surface of which they are secured. The outer edges of these fins engage the inner surface of the hopper tube to space them annularly and provide air passage, as seen in Fig. 4. Insertion of the nozzle into the tube may be limited in any convenient manner, as by a transverse rod 22 secured to the outer edges of a pair of fins as shown in Fig. 4.

When it is desired to unload a hopper car, such as shown in Fig. 1, nozzle 18 is removed from tube 17 and the auxiliary hopper is then placed beneath the outlet of car hopper 4. The auxiliary hopper is raised until it engages the frame of valve 5 and is then moved laterally to insert one of its top flanges in a lateral recess 26 (Fig. 3) with which the door frame illustrated is provided at one side of the outlet. Such a door frame is provided at the opposite side of the outlet with a horizontal ledge 27 against the bottom of which hopper flange 16 is held by U-shaped clamps 28 secured to the bottom of the hopper flange and overlapping the ledge. To prevent the auxiliary hopper from slipping out of recess 26, vertical set screws 29 threaded in the upper arms of the U-shaped clamps are tightened against the top of the door frame ledge. Nozzle 18, connected to the inlet hose 31 of a pneumatic conveyor as shown in Fig. 1, is inserted in hopper tube 17 and the main hopper door (valve 5) is then opened to permit the bulk material in the car to start flowing by gravity into auxiliary hopper 11. The air that is drawn into the nozzle by suction apparatus connected to conveyor hose 31 enters the auxiliary hopper through inlet passage 19 between the nozzle and hopper tube. As this air enters the nozzle it carries bulk material from the auxiliary hopper with it and delivers it to the desired remote location.

Hopper unloaders constructed in accordance with this invention permit all types of hopper cars or the like to be easily and economically unloaded, and they are especially suited to use with closed cars of this type. The material being removed is not exposed to dirt and water during the unloading because it flows directly from the main hopper into the conveyor hose through the closed auxiliary hopper. The only labor required is the small amount involved in fastening the auxiliary hopper in operative position and shifting the unloader from hopper to hopper as the compartments are successively unloaded. Manipulation of the conveyor hose and nozzle during unloading is entirely eliminated. In addition to permitting the conveyor system to operate at full capacity all of the time, my invention eliminates harmful surging in the system due to irregular feed. Contamination of the material is likewise avoided.

As an example of the extent to which unloading time can be reduced by this invention, one user has found that it requires at least 4½ hours to unload 30 tons of light 58 per cent soda ash from a box car. By using the unloader disclosed herein with the same suction system that company unloaded the same amount of soda ash from a closed top hopper car in 3½ hours, a saving in time of over 22 per cent. In addition, there were the savings referred to above, i. e., labor and wear and tear on the conveyor hose and system.

Various modifications may be made, as will appear to those familiar with the art, as, for example, in the mode of associating the unloader with the car hopper or to adapt it to use with hopper closures other than those of the type shown and described, which has been referred to only by way of illustration. That is, the essence of the invention resides in an unloader adapted to receive bulk granular material from hopper bottom cars and provided with means for association with a suction conveyor system, and in its broadest aspects as thus considered the invention does not reside in an unloader for use with a specific type of freight car hopper, or with specific means of attachment thereto. Therefore the unloaders provided by the invention may be modified as need be to adapt them to various types of hoppers other than that shown, and the mode of associating the unloaders with the hoppers may be varied, without departing from the essence of the invention. Other changes will occur to workers in the art. For instance, hopper bottom cars are generally divided longitudinally into separate hopper compartments so that the hoppers occur in laterally placed pairs, and obviously a single unloader may be associated with two such hoppers.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. A hopper unloader comprising an auxiliary hopper adapted to be detachably connected to the bottom of a main hopper below its outlet, a tube projecting out of one side of the auxiliary hopper and rigidly connected thereto, the walls of the auxiliary hopper being closed except for said tube, and a second tube disposed in the first tube with a space between them to provide an air inlet passage, the outer end of said second tube being adapted to be connected to a conduit of a suction conveyor system.

2. A hopper unloader comprising an auxiliary hopper adapted to be detachably connected to the bottom of a main hopper below its outlet, a tube projecting out of one side of the auxiliary hopper and rigidly connected thereto, the walls of the auxiliary hopper being closed except for said tube, and a suction conveyor nozzle slidably extending into said tube and provided with a plurality of upstanding spacing members at circumferentially spaced intervals to space the nozzle from the tube and provide an air inlet passage between them.

3. A hopper unloader comprising an auxiliary hopper adapted to be detachably connected to the bottom of a main hopper below its outlet, a straight tube projecting into the auxiliary hopper through a wall thereof and rigidly connected thereto, the walls of the auxiliary hopper being closed except for said tube, a suction conveyor nozzle slidably mounted in said tube, means associated with the nozzle for spacing it from the tube to provide an air inlet passage between them, and means limiting the distance the nozzle can be inserted in the tube.

4. A hopper unloader comprising an auxiliary hopper adapted to be detachably connected to the bottom of a main hopper below its outlet, a tube projecting into the auxiliary hopper through a side thereof and rigidly connected thereto, the walls of the auxiliary hopper being closed except for said tube, a suction conveyor nozzle slidably mounted in said tube, means for spacing the nozzle from the tube to provide an air inlet passage between them, and a rod connected to the outside of the nozzle transversely thereof for engaging the outer end of the tube to limit movement of the nozzle into the tube.

5. An unloader for a hopper-type railway car having a lateral flange at one side of its sliding horizontal unloading door, said unloader comprising an auxiliary hopper adapted to be disposed against the bottom of the car hopper below said door, an upwardly extending member connected to the auxiliary hopper and adapted to overlie said flange, a screw in said member for engaging the top of the flange to support the auxiliary hopper in operative position, a tube opening into the auxiliary hopper and projecting from one side of it, a nozzle extending into said tube, and means for spacing the nozzle from the tube to provide an air passage between them, the outer end of the nozzle being adapted to be connected to a conduit of a suction conveyor system.

6. An unloader for a hopper-type railway car having a lateral recess at one side of its sliding horizontal unloading door, said unloader comprising an auxiliary hopper adapted to be disposed against the bottom of the car hopper below said door, the top of said hopper being provided with an outwardly extending flange adapted to project into said recess, means at the opposite side of the auxiliary hopper for detachably connecting it to the railway car, a tube opening into the auxiliary hopper and projecting from one side of it, a nozzle extending into said tube, and means for spacing the nozzle from the tube to provide an air passage between them, the outer end of the nozzle being adapted to be connected to a conduit of a suction conveyor system.

JAMES CLINE McKENNA.